US008566330B1

(12) United States Patent
Barak et al.

(10) Patent No.: US 8,566,330 B1
(45) Date of Patent: Oct. 22, 2013

(54) PRIORITIZING FEED CONTENT

(75) Inventors: Nimrod Barak, Tel Aviv (IL); Doron Lehmann, Kfar Vradim (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 13/438,068

(22) Filed: Apr. 3, 2012

(51) Int. Cl.
*G06F 17/30* (2006.01)
(52) U.S. Cl.
USPC .......................................................... 707/748
(58) Field of Classification Search
USPC ................ 707/2, 748; 725/35, 39, 5; 709/224
See application file for complete search history.

(56) References Cited

U.S. PATENT DOCUMENTS

| | | | | |
|---|---|---|---|---|
| 2002/0059588 | A1* | 5/2002 | Huber et al. | 725/35 |
| 2007/0083892 | A1* | 4/2007 | Yun et al. | 725/39 |
| 2010/0274889 | A1* | 10/2010 | Carter et al. | 709/224 |
| 2011/0321072 | A1* | 12/2011 | Patterson et al. | 725/5 |

* cited by examiner

*Primary Examiner* — Etienne Leroux
(74) *Attorney, Agent, or Firm* — Fish & Richardson P.C.

(57) ABSTRACT

Techniques for providing prioritized content to a mobile device include detecting, for each feed of a number of feeds delivered to the mobile device through a portal, one or more associated tags, each tag comprising a keyword; comparing the one or more tags associated with the feeds to one or more properties associated with a user profile of a user in the portal; ranking, based on the comparison, the feeds to define a ranked list of feeds; and preparing a subset of the ranked list of feeds for display on the mobile device.

21 Claims, 4 Drawing Sheets

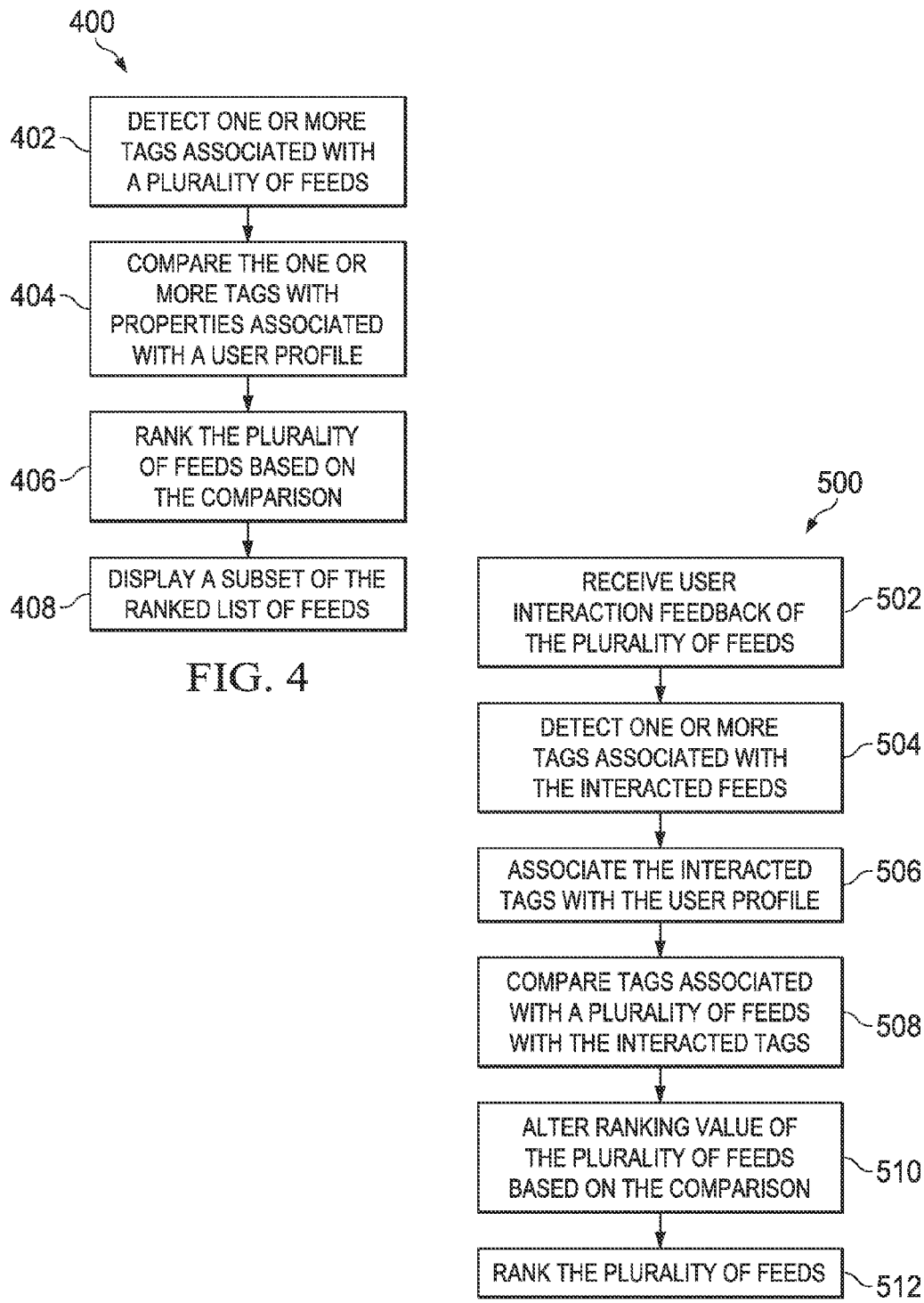

PRIORITIZING FEED CONTENT

TECHNICAL BACKGROUND

This disclosure relates to prioritizing content feeds and, more particularly, prioritization of content feeds based on user interaction with the content feeds.

BACKGROUND

When consuming feeds (e.g., RSS content) in a virtual workspace, and specifically in mobile devices, there may be little or no control (e.g., prioritization) over the list of content feeds that are being displayed. Further, a mobile device can have a small screen area (e.g., screen real estate) for displaying a listing of such content feeds. Thus, only a limited number of content feeds may be presented by the mobile device as compared to a larger computing platform such as a desktop computer.

SUMMARY

This disclosure describes systems, methods, apparatus, and computer-readable media for providing prioritized content to mobile devices. In some embodiments, tags (e.g., keywords) can be detected that are associated with the content. The content can include feeds (such as RSS feeds) that are delivered to the mobile devices thru a portal and the tags can describe the feed. For example, a feed from a news source can be associated with the tag "news." A user of the mobile device can be associated with a user profile in the portal. The user profile can be associated with properties (e.g., properties that describe the user associated with the user profile). The tags associated with the feeds can be compared to the properties associated with the user profile. The feeds that are delivered to the mobile device can be ranked based on the comparison between the tags associated with the feeds and the properties associated with the user profile. The ranking of the feeds can define a ranked list of feeds. This ranked list of feeds can be displayed by the mobile device.

A general embodiment of the subject matter described in this disclosure can be implemented in methods that include detecting, for each feed of multiple feeds delivered to the mobile device through a portal, one or more associated tags, each tag comprising a keyword; comparing the one or more tags associated with the feeds to one or more properties associated with a user profile of a user in the portal; ranking, based on the comparison, the feeds to define a ranked list of feeds; and preparing a subset of the ranked list of feeds for display on the mobile device.

Other general embodiments include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first aspect combinable with any of the general embodiments, ranking further includes at least one of providing a ranking value to each of the feeds based on the comparison; or ordering the feeds based on the ranking value from a highest ranking value to a lowest ranking value.

In a second aspect combinable with any of the previous aspects, the one or more properties associated with the user profile includes one or more user-related tags and one or more roles of the user.

In a third aspect combinable with any of the previous aspects, preparing the subset of the ranked list of feeds further includes preparing the subset of the ranked list of feeds for display on the mobile device based on a screen display size of the mobile device.

A fourth aspect combinable with any of the previous aspects further includes receiving a location of the user, wherein ranking further includes ranking the feeds based on the location.

A fifth aspect combinable with any of the previous aspects further includes receiving one or more user-defined tags associated with the ranked list of feeds, wherein comparing further includes comparing the one or more user-defined tags with the user profile of the user.

A sixth aspect combinable with any of the previous aspects further includes receiving feedback indicating an user interaction with the subset of the ranked list of feeds to define an interacted number of feeds; detecting, for each feed of the interacted feeds, one or more associated tags to define interacted tags; associating the interacted tags with the user profile of the user; comparing the tags associated with the feeds to the interacted tags associated with the user profile of the user; altering, based on the comparison, a ranking value of the feeds; and re-ranking, based on the altering, the ranked list of feeds.

In a seventh aspect combinable with any of the previous aspects, the feedback indicating the user interaction further includes feedback indicating a time of the user interaction.

An eighth aspect combinable with any of the previous aspects further includes associating the time with the one or more tags of the interacted plurality of feeds.

In a ninth aspect combinable with any of the previous aspects, altering further includes altering the ranking value of the interacted feeds based on the associated time of the one or more tags of the interacted feeds relative to a current time.

In a tenth aspect combinable with any of the previous aspects, detecting the one or more tags associated with multiple feeds further includes detecting metadata including the one or more tags of the feeds.

In an eleventh aspect combinable with any of the previous aspects, comparing the one or more tags to one or more properties associated with the user profile of the user further includes matching the one or more tags with the properties associated with the user profile.

A twelfth aspect combinable with any of the previous aspects includes increasing a ranking value of the feeds associated with the one or more tags that are matched with the properties associated with the user profile.

A thirteenth aspect combinable with any of the previous aspects includes increasing the ranking value of the feeds based on a number of associated tags that match the properties associated with the user profile.

Various embodiments of an object suggestion engine according to the present disclosure may have one or more of the following features. For example, only relevant feeds are provided to a user of a mobile device as compared to an entire listing of feeds normally provided to a user at a desktop computer. By providing only the relevant feeds to a mobile device, a user can improve efficiency while interacting with such feeds on the mobile device.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 4 illustrates an example method for providing prioritized content.

FIG. 5 illustrates an example method for providing prioritized content based on user interaction.

DETAILED DESCRIPTION

This disclosure describes systems, methods, apparatus, and computer-readable media for providing prioritized content to mobile devices. In some embodiments, tags (e.g., keywords) can be detected that are associated with the content. The content can include feeds (such as RSS feeds) that are delivered to the mobile devices thru a portal and the tags can describe the feed. For example, a feed from a news source can be associated with the tag "news." A user of the mobile device can be associated with a user profile in the portal. The user profile can be associated with properties (e.g., properties that describe the user associated with the user profile). The tags associated with the feeds can be compared to the properties associated with the user profile. The feeds that are delivered to the mobile device can be ranked based on the comparison between the tags associated with the feeds and the properties associated with the user profile. The ranking of the feeds can define a ranked list of feeds. This ranked list of feeds can be displayed by the mobile device.

Figure 1:
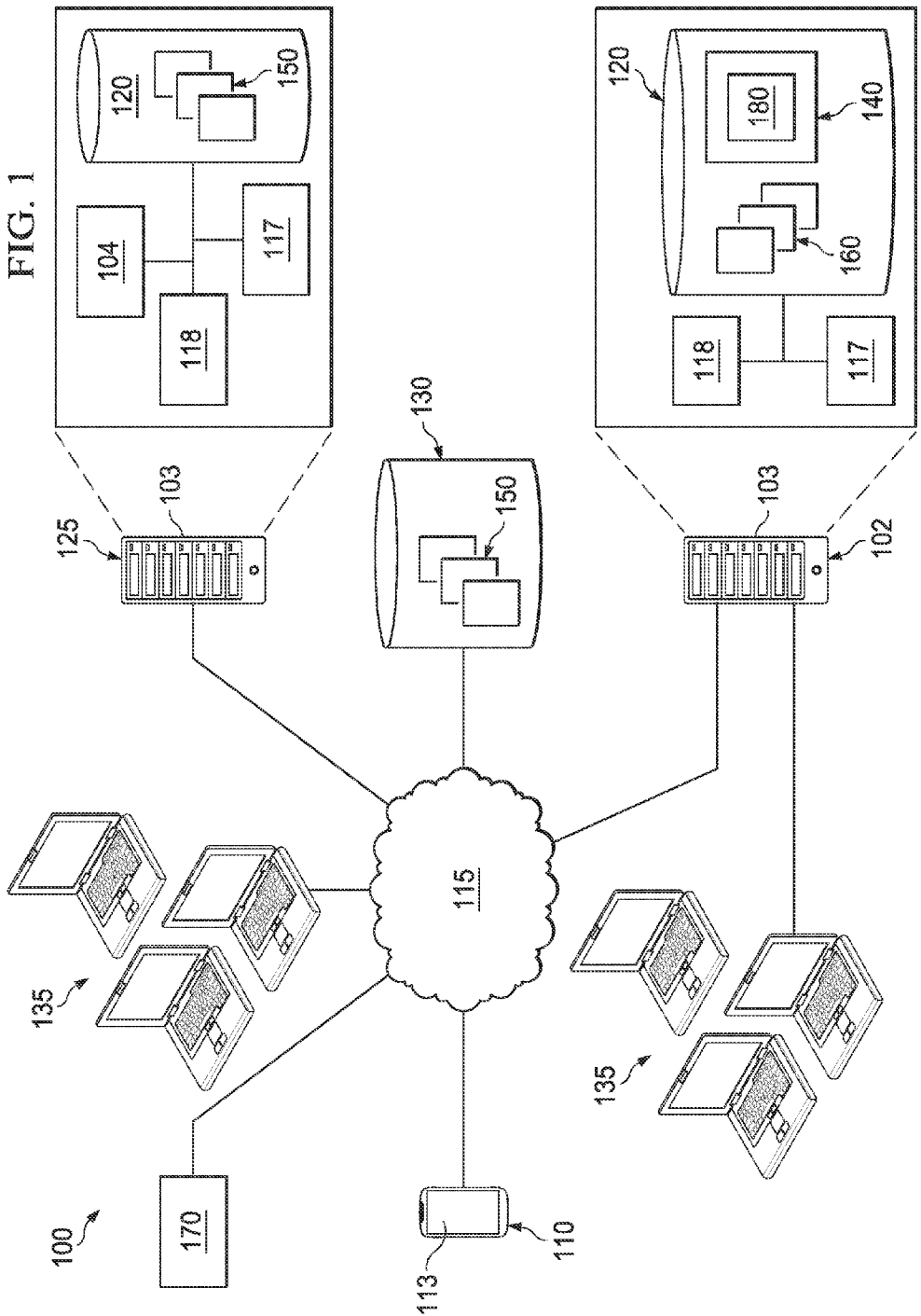
FIG. 1 illustrates an example distributed computing system operable to provide prioritized content to mobile devices.

FIG. 1 illustrates an example distributed computing system 100 operable to provide prioritized content to mobile devices. For example, the illustrated environment 100 includes or is communicably coupled with an enterprise computing system 102, a mobile communications device 110 ("mobile device"), a software provider computing system 125, a repository 130, one or more client computing devices 135 ("clients"), and a third party content provider 170, at least some of which communicate across a network 115.

The enterprise computing system 102 and the software provider computing system 125 both include separate servers 103. In general, each server 103 stores one or more hosted applications, such as, for example, a feed prioritization module 104, where at least a portion of the hosted applications are executed via requests and responses sent to users or clients within and communicably coupled to the illustrated environment 100 of FIG. 1. In some instances, the server 103 may store one or more various hosted applications, while in other instances, the server 103 may be a dedicated server meant to store and execute only a single hosted application (e.g., the feed prioritization module 104). In some instances, the server 103 may include a web server, where the hosted applications represent one or more web-based applications accessed and executed via network by the mobile device 110, the clients 135, or both to perform the programmed tasks or operations of the hosted application.

At a high level, each server 103 includes an electronic computing device operable to receive, transmit, process, store, or manage data and information associated with the environment 100. For example, one or both of the servers 103 illustrated in FIG. 1 may be responsible for receiving application requests from one or more client applications associated with the mobile device 110, the clients 135 or both of the environment 100 and responding to the received requests by processing said requests in an associated hosted application, and sending the appropriate response from the hosted application back to the requesting client application. In addition to requests from the mobile device 110, the clients 135 or both illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates single servers 103 for each of the enterprise computing system 102 and software developer computing system 125, environment 100 can be implemented using two or more servers 103 for each computing system (102 and 125), as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

The server 103 of software provider computing system 125 includes the feed prioritization module 104. The illustrated feed prioritization module 104 filters the web content such that prioritized feeds are displayed to a user of the mobile device 110, the client devices 135, or both, as described further below. The illustrated feed prioritization module 104 can be implemented by and stored by any combination of the enterprise computing system 102, the software providing computer system 125, the repository 130, the clients 135, and the mobile device 110.

Each of the illustrated servers 103 also includes an interface 117, a processor 118, and a memory 120. The interface 117 is used by the server 103 for communicating with other systems in a distributed environment—including within the environment 100—connected to the network 115; for example, the clients 135, the mobile device 110, or both, as well as other systems communicably coupled to the network 115. Generally, each interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, each of the servers 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the clients 135 and/or the mobile device 110.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Each of the servers 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102, 125. Additionally, the memory 120 may include any other appropriate data, such as VPN applications, firmware logs and policies, firewall policies, a security or access log, print or other reporting files, as well as others.

The environment further includes a repository 130. In some embodiments, the repository 130 is an in-memory repository. The repository 130 can be a cloud-based storage medium. For example, the repository 130 can be networked online storage where data is stored on virtualized pools of storage.

The illustrated environment of FIG. 1 also includes one or more clients 135 and the mobile device 110, or multiple mobile devices 110. Each client 135 and/or the mobile device 110 may be any computing device operable to connect to or communicate with at least the computing systems 102, 125 and/or via the network 115 using a wireline or wireless connection. In general, each client 135 and/or the mobile device 110 includes an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes six clients 135 and one mobile device 110, alternative implementations of environment 100 may include a single client 135 or multiple mobile devices 110 communicably coupled to the server 102 and/or the network 115, or any other number suitable to the purposes of the environment 100.

Additionally, there may also be one or more additional clients 135 and/or mobile devices 110 external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, tablet computer, smart phone, cell phone, personal digital assistant (PDA), touch screen terminal, workstation, network computer, kiosk, one or more processors within these or other devices, or any other suitable processing device.

The illustrated mobile device 110 may be any mobile computing device such as a wireless data port, smart phone, personal data assistant (PDA), tablet computing device, one or more processors within these devices, or any other suitable processing device. For example, each client 135 and the mobile device 110 may include a computer that includes an input device, such as a keypad, touch screen, mouse (in the client 135 example), or other device that can accept user information, and an output device that conveys information associated with the operation of the computing systems 102, 125 or the client 135 or the mobile device 110 itself, including digital data, visual information, or a graphic user interface (GUI) 113, as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the mobile device 110 includes the GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include one or more user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

In some embodiments, one or more of the mobile device 110 (or mobile devices 110) and clients 135 may access one or more applications hosted on the software developer computing system 125 through a portal such as an enterprise portal, also known as an enterprise information portal (EIP) or corporate portal. The web portal (e.g., portal 204 illustrated in FIG. 2) may be a framework for integrating information, people and processes across organizational boundaries. It provides a secure unified access point, often in the form of a web-based user interface, and is designed to aggregate and personalize information through application-specific portlets. For example, the web portal may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether The environment 100 further includes user data 140, web content 150, and content items 160. In the illustrated embodiment, the user data 140 is stored by the memory 120 of the enterprise computing system 102. However, the user data 140 can be stored in any combination of the memory of the mobile device 110, the enterprise computing system 102, the software provider service computing system 125, the repository 130, and/or the clients 135. In some embodiments, the user data 140 is stored by a third party that provides networked online storage. In some embodiments, the user data 140 can include user profiles 180 of users of the clients 135 and the mobile device 110. The user profiles 180 can include information (e.g., properties) specific to the users, including identifying information such as user name, role of the user (within the portal) (e.g., "human resources manager"), and related projects (e.g., "software development"). The user profiles 180 can also store information tags related to the information of the user. For example, the user profile 180 can store tags associated with the role of the user and/or the related projects. The user profiles 180 can also store user-defined tags that the user desires to be associated with (e.g., self-defined tags). For example, the self-defined tags can include business expertise, technologies, methodologies, and location.

The web content 150 is the textual, visual or aural content that is encountered as part of the user experience on websites. The web content 150 may include, among other things: text, images, sounds, videos, applications, sub-applications, and animations. The web content is stored by any combination of the software provider service computing system 125 and the repository 130.

The illustrated content items 160 are sub-portions of the web content 150. The content items 160 are any kind of application, information, or service that can be visualized in a Web browser frame. The content items 160, in some embodiments, may be self-contained Web documents that are provided via a Uniform Resource Locator (URL) that are managed by the enterprise computing system 102. For example, the content items 160 can include alerts, reports, emails, calendars, text documents, multimedia files, reports, files, applications, and other content. For example, if a user enters a word in a dictionary content item 160, the definition appears inside the area of the content item 160. A link to usage examples, similar words, etc. can also be provided.

The illustrated content items 160 can include one or more of the characteristics of: stateless (not permanently connected to any component of the environment 100); embedded (non-dominant, parallel to other content items 160); provide previews on underlying processes and/or data; one-screen interactions; include only key functionality; provide direct access without navigation; push information and refresh periodically; integration with third-party software; and allow users to modify an appearance thereof. The content items 160 may provide data, for example, data that: provides active information; monitors business processes; previews data and processes; displays notifications for starting task-related processes; and offers access to often used data. The sub content items 160 may further provide direct access to simple applications; accelerated access to other applications; reduction of information and interaction to the necessary; and drag-and-relate that use outputs as inputs within the environment 100. The content items 160 offer customization such that specific content items 160, along with reduction of information and tailoring of information presented by the content items 160, can be implemented according to the user data 160.

In some embodiments, the content items 160 can further include feed content. The feed content (or feeds) can include any type of web feed (or news feed) that is in a data format used for providing the clients 135 and the mobile device 110 frequently updated content. For example, the feeds can include RSS (RDF Site Summary or Really Simply Syndication) feeds or Atom Syndication Format feed. The feeds can be associated with tags, described further below, that describe the respective feeds and facilitate locating of the feeds by browsing or searching.

As illustrated, the content items 160 are stored by the memory 120 of the enterprise computing system 102. However, the content items 160 can be stored in any combination of the memory the enterprise computing system 102, the software provider service computing system 125, and/or the repository 130. In some embodiments, the content items 160 can be provided by and stored by the third party content provider 170.

Figure 2:
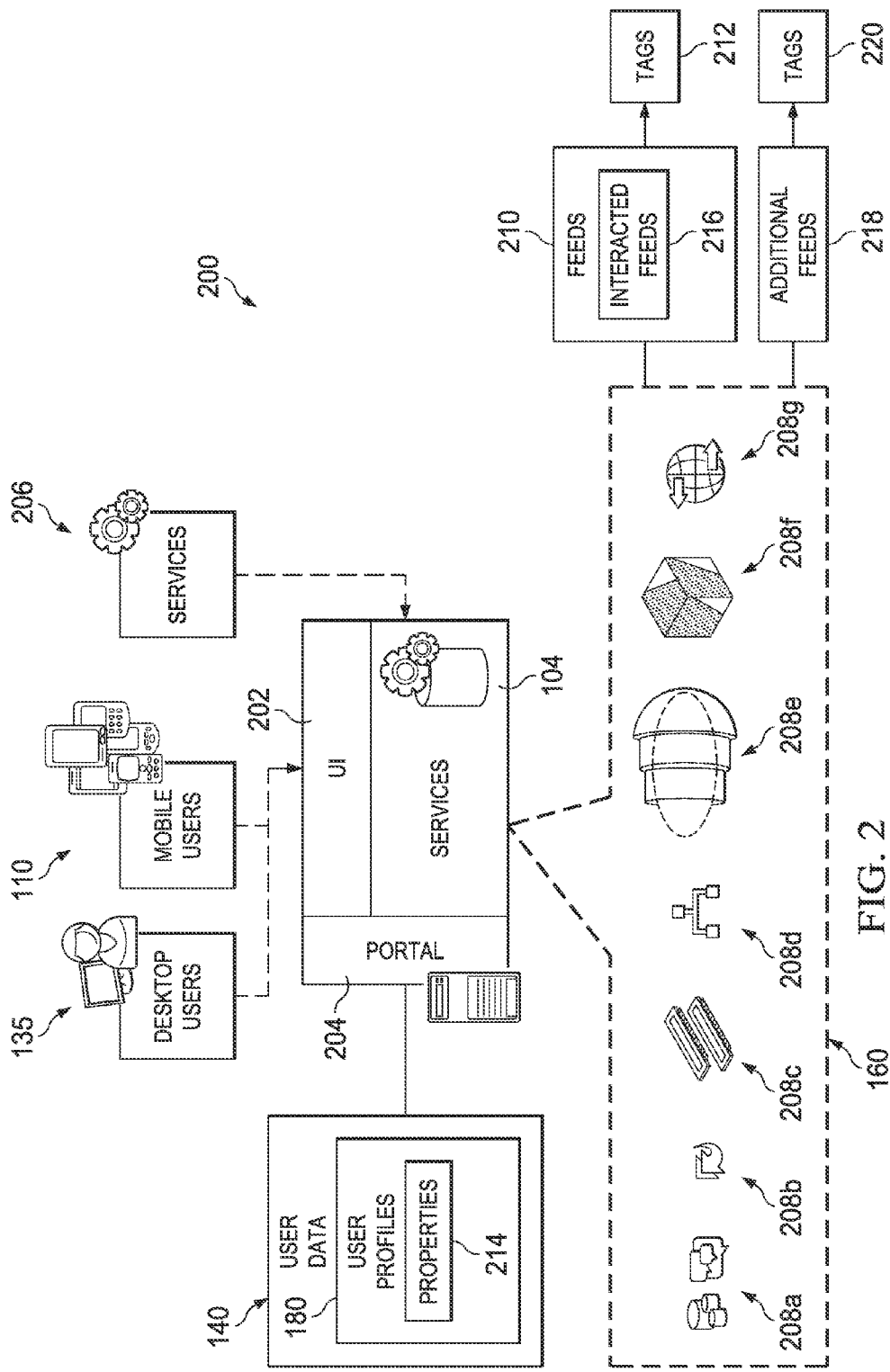
FIG. 2 illustrates an example environment of a distributed computing system operable to prioritize feeds.

FIG. 2 illustrates an example environment 200 of a distributed computing system operable to prioritize feeds. The environment 200 includes the clients 135, the mobile device 110, the feed prioritization module 104, a graphical user interface (GUI) 202, a portal 204, services 206, content sources 208a-208g, the content items 160, and the user data 140 that includes the user profiles 180. The content items 160 further include feeds 210 and associated tags 212. The user profiles 180 further include properties 214. Users of the clients 135, users of the mobile device 110, or users of both ("users") access the feeds 210 through interaction with the GUI 202.

In the illustrated embodiment, the services 206 may facilitate communication between the feed prioritization module 104 and the clients 135 and/or the mobile device 110 outside of the GUI 202. Accordingly, the clients 135 and the mobile device 110 may implement the functionality of the contextual navigation portal engine 104 without accessing the GUI 202 (i.e., without a UI layer), such as, for example, through a query.

The feeds 212 can be stored by, and retrieved from, the one or more content sources 208a-208g. Content source 208a, for instance, may include a collaboration module that stores, references, and/or accumulates content for sharing and other collaborative actions across multiple systems and/or user (such as across a business enterprise). For example, a collaborative environment or collaboration module in an enterprise environment may share and accumulate information (i.e., content) that enables users to share content and work together in mutual areas in the portal.

Content source 208b, for instance, may include an enterprise resource system (ERP) associated with the software developer computing system 125 that integrates internal and external business and management information across a business enterprise (e.g., finance/accounting, manufacturing, sales and service, and customer relationship management streams of data). The ERP system may facilitate the flow of information between all business functions inside the boundaries of the organization and manage the connections to outside customers and/or clients. The ERP system may include a client/server architecture with one or more databases with modifiable software executing thereon to provide an end-to-end business solution.

Content source 208c, for instance, may include content stored, referenced, and/or calculated on an in-memory database associated with the software developer computing system 125. The in-memory database may include integrated processing, i.e., all business and/or analytic operations done in processing memory. Moreover, content from business content sources may be replicated from one or more transactional systems (e.g., coupled to the network 115) to the in-memory database immediately. Thus, the in-memory database, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer). In some embodiments, the in-memory database may expose business data and capabilities to improve an end-solution for end users (e.g., the clients 135). The in-memory database may reside on top of a computational engine that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

Content source 208d, for instance, may include a gateway technology associated with the software developer computing system 125 that provides a simple way to connect devices, environments and platforms based on market standards. For example, the gateway may, for example, be a front-end server to a business suite application and expose business suite services in an open protocol format. Exposed content may include, business and/or social data through social updates, for example, Twitter, Facebook, RSS feed/channels, and/or other feed sources or channels.

Content source 208e, for instance, may include a business object repository. Each business object stored in the repository, for example, may include a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contain four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may include statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

Content source 208f, for instance, may include, a business intelligence module that, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

Content source 208f, for instance, may be content from third party platforms, such as content from third parties unaffiliated with, for example, the software developer computing system 125 and enterprise computing system 102. For instance, content source 208f may be content from third party content provider 170.

As mentioned above, the clients 135 and the mobile device 110 are provided the feeds 210 from one or more content sources 208a-208g. In some examples, the clients 135 and the mobile devices 110 are provided the feeds 210 from the count source 208d. The feeds 210 can include any type of web feed (or news feed) that is in a data format used for providing the clients 135 and the mobile device 110 frequently updated content. To that end, the feeds 210 provided to the clients 135 and the mobile device 110 can be prioritized. Specifically, to prioritize the feeds 210, one or more tags 212 can be detected that are associated with each of the feeds 210. The tags 212 are compared to the properties 214 of the user profile 180 of a user in the portal 204. The properties 214 include the aforementioned information that is specific to the user (e.g., user name, role of the user, related projects, etc.). In some embodiments, a ranking value of the feeds 210 is provided by the comparison. The feeds 210 are ranked based on the comparison to define a ranked listed of feeds 210. In some embodiments, the feeds 210 are ranked based on a ranking value of the feeds 210. A subset of the ranked list of feeds 210 are prepared for display by the clients 135 and/or the mobile device 110.

Specifically, one or more tags 212 can be detected that are associated with each of the feeds 210. The associated tags 212, in some embodiments, can be a keyword or term that is associated with the feed 210 that describes the feed 210 and that allows the feed 210 to be found again by browsing and/or searching. For example, a feed 210 can be associated with tags 212 relating to a role of the user (e.g. a human resources tag, a developer's role tag, or a manager's role tag); content of the feed (e.g., a corporate news tag or a sales data tag); and projects (e.g., software development). In some examples, the feeds 210 can be associated with tags 212 related to business expertise, technologies, methodologies, and location.

In some embodiments, the tags 212 that are associated with a particular feed 210 are included by metadata of the particular feed 210. In some embodiments, a feed 210 can be associated with more than one tag 212. In some embodiments, two or more feeds 210 can be associated with the same tag 212. In some embodiments, the portal 204 detects which tags 212 are associated with the feeds 210. In some embodiments, the feed prioritization module 104 detects which tags 212 are associated with the feeds 210.

As mentioned above, the user data 140 can include the user profile 180 for each user of the clients 135 and the mobile device 110 that interact with the portal 204. Also, as mentioned above, the user profile 180 of each user can include one or more properties 214. To that end, for a particular user of the mobile device 110 or the clients 135, the tags 212 that are associated with the feeds 210 can be compared to the proprieties 214 of the user profile 180 associated with the particular user.

In some embodiments, comparing the tags 212 that are associated with the feeds 210 with the properties 214 associated with the user profile 180 can include matching the tags 212 with the properties 214. In some embodiments, a ranking value of the feeds 210 are based on the matching between the tags 212 associated with the feeds 210 and the properties 214 associated the user profile 180. In some embodiments, the ranking value of a feed 210 can be based on a number of tags 212 that are associated with the feed 210 that are matched to the properties 214 associated with the user profile 180. For example, a higher number of tags 212 associated with the feed 210 that are matched to the properties 214 associated with the user profile 180 can result in a higher ranking value of the respective feed 210 (and similarly, a lower number of matches can result in a lower ranking value of the respective feed 210).

In some embodiments, the number of tags 212 associated with the feed 210 that match the properties 214 associated with the user profile 180 is based on a number of tags 212 associated with the feed 210 that match differing properties 214 associated with the user profile 180 (e.g., two or more tags 212 associated with the feed 210 that match the same property 214 is considered a single match). In some embodiments, the number of tags 212 associated with the feed 210 that match the properties 214 associated with the user profile 180 is based on a total number of tags 212 associated with the feed 210 that match properties 214 associated with the user profile 180 (e.g., two or more tags 212 associated with the feed 210 that match the same property 214 are considered two matches).

In some embodiments, a tag associated with the feed 210 can match more than one property 214 associated with the user profile 180. In some embodiments, more than one tag associated with the feed 210 can match the same property 214 associated with the user profile 180. In some embodiments, the feed prioritization module 104 compares the tags 212 associated with the feeds 210 to the properties 214 of the user profile 180 associated with the particular user.

In some embodiments, comparing the tags 212 that are associated with the feeds 210 with the properties 214 of the user profile 180 can further include providing a matching value between the tags 212 and the properties 214. When a matching value between a tag 212 associated with a feed 210 and a property 214 associated with a user profile 180 is above (or equal to) a matching threshold, the tag 212 associated with the feed 210 and the property 214 associated with the user profile 180 are deemed to be matched. When the ranking value between a tag 212 associated with the feed 210 and a property 214 associated with the user profile 180 is below a matching threshold, the tag 212 associated with the feed 210 and the property 214 associated with the user profile 180 are not deemed to be matched (or, in some embodiments, deemed to be not matched).

In some embodiments, the ranking value of the feeds 210 can be based on the matching values of the tags 212 associated with the respect feeds 210. For example, the tags 212 associated with the feeds 210 are associated with a matching value with respect to each property 214 of a user profile 180. The ranking value of the feed 210 can be based on the matching values of each tag associated with the feed 210 or the matching values of a subset of the tags 212 associated with the feed 210. In some embodiments, the ranking value of the feed 210 can be based on the matching values of a subset of the tags 212 associated with the feed 210 that are above the matching threshold. In some embodiments, the ranking value of a feed 210 can be an average or a summation of the matching values of the tags 212 (e.g., each tag 212 or a subset of the tags 212) associated with the feed 210. For example, the ranking value of a feed 210 can be an average or a summation of the matching values of the tags 212 that are associated with a matching value above the matching threshold.

In some embodiments, matching the tags 212 with the properties 214 can include keyword matching between the tags 212 associated with the feeds 210 and the properties 214 associated with the user profile 180. For example, a keyword of the tags 212 associated with each of the feeds 210 can be compared to a keyword associated with the properties 214 of the user profile 180. The matching between the respective keywords can be partial or direct (full) matching. When a keyword of a tag 212 associated with a feed 210 fully matches a keyword associated with a property 214 of the user profile 180, the tag 212 and the property 214 are considered to fully match. For example, the tag 212 associated with the feed 210 includes the keyword "human resources" and the property 214 associated with the user profile 180 includes the keyword "human resources," then the tag 212 and the property 214 are considered to fully match.

When a keyword of a tag 212 associated with a feed 210 partially matches a keyword associated with a property 214 of the user profile 180, the tag 212 and the property 214 are considered to partially match. For example, the tag 212 associated with the feed 210 includes the keyword "sales forecasting" and the property 214 associated with the user profile 180 includes the keyword "sales news," then the tag 212 and the property 214 are considered to partially match. In some embodiments, the ranking value of a feed 210 can be based on whether the matching between tags 212 associated with the feed 210 and the properties 214 associated with a user profile 180 is a partial match or a direct (full) match. For example, a direct match between a tag 212 associated with a feed 210 and a property 214 associated with a user profile 180 can result in a higher ranking value of the respective feed 210; and a partial match between a tag 212 associated with a feed 210 and a property 214 associated with a user profile 180 can result in a lower ranking value of the respective feed 210 as compared to a direct match between the same.

In some embodiments, the matching between the tags 212 and the properties 214 can be performed automatically (e.g., in response to detecting the tags 212) via an algorithm and a dictionary.

The feeds 210 are ranked based on the comparison of the tags 212 associated with the feeds 210 and the properties 214 of the user profile 180 to define a ranked list of feeds 220. As mentioned above, the feeds 210 are associated with a ranking value. The feeds 210 can be ranked (ordered) based on the ranking value. In some embodiments, the feeds 210 are ranked based on the ranking value from a highest ranking value to a lowest ranking value. In some embodiments, only a subset of the feeds 210 are ranked. In some embodiments, only a subset of the feeds 210 are ranked that have respective ranking values above the ranking threshold. In some embodiments, the feed prioritization module 104 ranks the feeds 210.

A subset of the ranked list of feeds 220 is prepared for display on the clients 135 and the mobile device 110. For example, the ranked list of feeds 220 is displayed by the GUI 113 of the mobile device 110. In some embodiments, the subset of the ranked list of feeds 220 can include feeds 210 having a ranking value above the ranking threshold. In some embodiments, the subset of the ranked list of feeds 220 is based on a screen display size of the clients 135 and/or the mobile device 110. For example, as mentioned above, the mobile device 110 has a fixed display size. The number of feeds 210 that are provided in the subset of the ranked list of feeds 220 can be based on the display size of the mobile device 110. For example, the number of feeds 210 provided to the mobile device 110 is a number of feeds 210 that can be sufficiently (e.g., as determined by a software developer or IT manager) displayed on the mobile device 110 and that is easily navigable by the user of the mobile device 110 (e.g., the number of feeds 210 is based on the capabilities of the mobile device 110). A larger display size of the mobile device 110 can facilitate display of a larger number of feeds 210 of the subset of the ranked list of feeds 220.

In some further embodiments, the ranking of the feeds 210 can be based on receiving a location of the user of the mobile device 110. The location of the user of the mobile device 110 can be determined by using a global positioning system (GPS), Wi-Fi locations, and/or cellular telephone towers (e.g., cellular tower location triangulation). Additionally, the tags 212 associated with the feeds 210 can further be associated with a location ("location tags") (e.g., a specific GPS coordinate, a general area (e.g., a city park), a metropolitan area (e.g., Austin, Tex.), or any other location defining area). The current location of the user of the mobile device 110 can be compared to the location tags of the feeds 210, similar to that mentioned above. Based on the matching of the location of the mobile device 110 and the location tags, the ranking value of the associated feeds 210 can be altered.

In some further embodiments, the ranking of the feeds 210 is further based on user-defined tags of the feeds 210. Specifically, the user of the clients 135 or the mobile device 110 can associate tags with the feeds 210 (e.g., the user "tags" the feed 210 with keywords.) To that end, the user-defined tags associated with the feeds 210 can be compared to the properties 214 of the user profile 180 of the user, similar to that mentioned above.

In some further embodiments, the ranking of the feeds 210 can be altered based on user interaction with the feeds 210. Specifically, as mentioned above, the subset of the ranked feeds 220 are prepared for display on the clients 135 and/or the mobile device 110. The user can interact with the subset of ranked feeds 220 by such interactions as scrolling through the list of feeds 210, selecting one of the feeds 210, reading the selected feed 210, deleting the selected feed 210, forwarding the selected feed 210, commenting on the selected feed 210, "liking" the selected feed 210, or other social interaction with the selected feed 210.

The user interaction with the subset of the ranked feeds 220 can be received to define interacted feeds 216. The interacted feeds 216 can include any portion (e.g., subset) or all of the feeds 210. One or more tags 212 can be detected that are associated with each of the interacted feeds 216, similar to that as mentioned above. The tags 212 that are associated with the interacted feeds 216 can be associated with the user profile 180 (e.g., are stored in the user data 140). For example, by the user interacting with certain feeds 210, the tags 212 that associated with those feeds 210 can now be associated with the user profile 180 of the user.

To that end, when prioritizing additional feeds 218 that are prepared for display by the mobile device 110 or the clients 135 for the user, tags 220 (analogous to the tags 212) associated with the additional feeds 218 are also compared (similar to that mentioned above) to the tags 212 stored by the user profile 180 that are associated with the interacted feeds 216. The additional feeds 218 can include any portion (e.g., subset) or all of the feeds 210; or can include new feeds (e.g., feeds not previously included by feeds 210); or can include a combination of any portion (or all) of the feeds 210 and new feeds.

The ranking value of the additional feeds 218 can be based on, in addition to or in lieu of the comparison of the tags 220 associated with the additional feeds 218 and the proprieties 214 of the user profile 180 (as mentioned above), the comparison of the tags 220 associated with the additional feeds 218 and the tags 212 stored by the user profile 180 that are associated with the interacted feeds 216. The additional feeds 218 can be ranked based on this comparison of the tags 220 associated with the additional feeds 218 and the tags 212 stored by the user profile 180 that are associated with the interacted feeds 216.

In some embodiments, the additional feeds 218 can be ranked based on this comparison of the tags 220 associated with the additional feeds 218 and the tags 212 stored by the user profile 180 that are associated with the interacted feeds 216 and the comparison of the tags 220 associated with the additional feeds 218 and the proprieties 214 of the user profile 180. As the user additionally interacts with the feeds 210 that are displayed by the clients 135 and the mobile device 110, more tags 212 that are associated with the interacted feeds 216 are also associated with the user profile 180 of the user, thus improving prioritization of the feeds 210.

In some embodiments, the tags 212 stored by the user profile 180 that are associated with the interacted feeds 216 can be weighted (weighted tags). Thus, when comparing the tags 212 stored by the user profile 180 that are associated with the interacted feeds 216 with the tags 220 associated with the additional feeds 218, additional feeds 218 that are associated with the tags 220 that are matched with weighted tags 212 that are stored by the user profile 180 can have a ranking value based on the weight of the weighted tags 212. Thus, the more weighted a tag 212 is, the more the ranking value of the additional feed 218 can be altered. To that end, the weight of the tags 212 associated with the interacted feeds 216 and stored by the user profile 180 can be based on a type of user interaction (e.g., a user interaction that is more involved can result in a heavier weighting); and a time duration of interaction (e.g., the more time an user interaction is can result in a heavier weighting). In some embodiments, the type of the user interaction and the time duration can decrease the weighting of the tag 212 associated with the interacted feed 210 and stored by the user profile 180.

Figure 3:
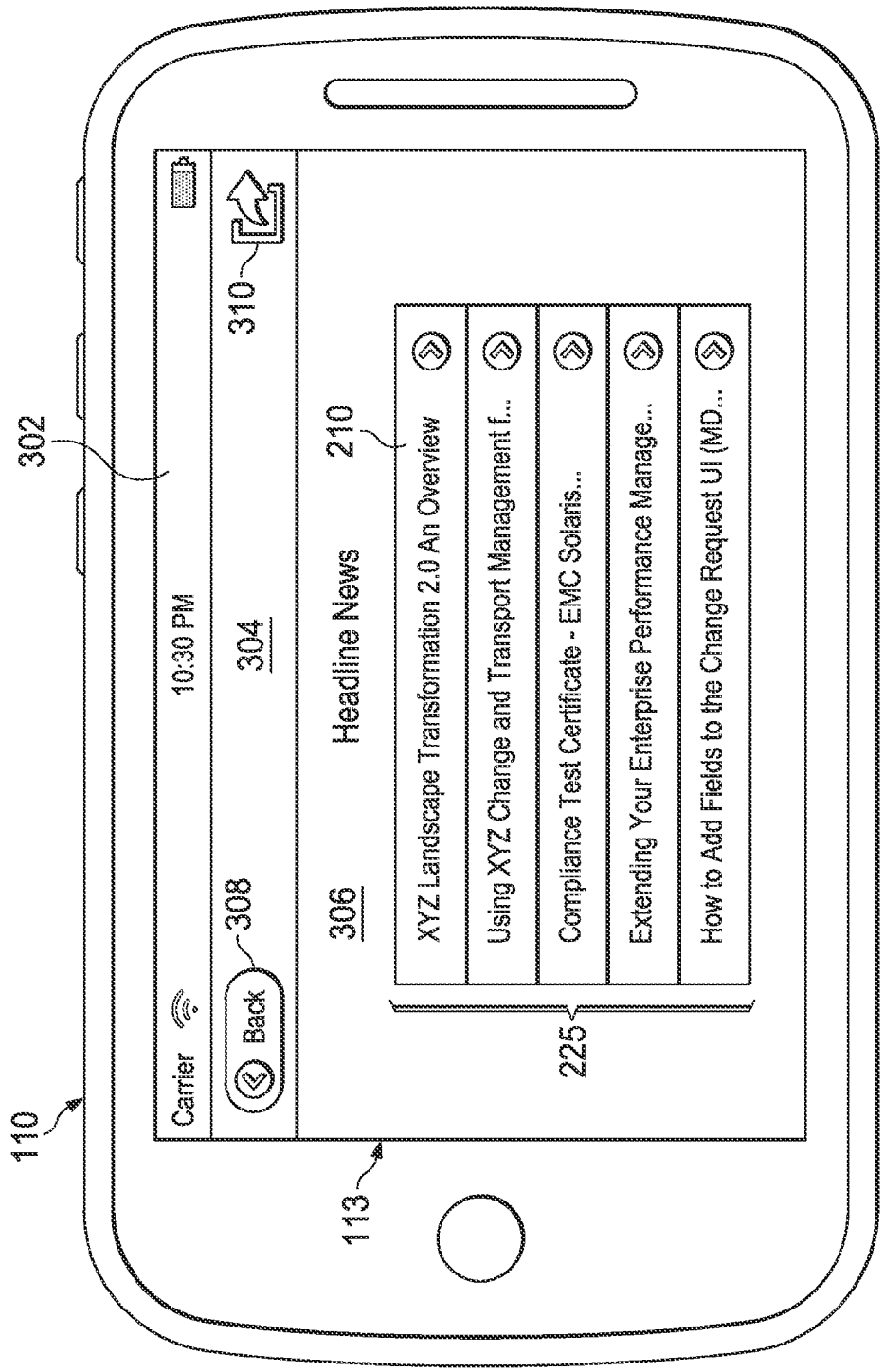
FIG. 3 illustrates the graphical user interface (GUI) of the mobile device depicting the subset of the ranked list of feeds.

FIG. 3 illustrates an example graphical user interface (GUI) 113 of the mobile device 110 depicting the subset of the ranked list of feeds 220. The illustrated GUI 113 includes a status bar 302, a navigation bar 304, and a content area 306. The status bar 302 can include information about the mobile device 110, such as carrier type, connection type, current time, and battery life. The information displayed by the status bar 302 varies and is specific to the operating system executed by the mobile device 110. The navigation bar 304 can include a navigation button 308 that facilitates navigation between the subset of the ranked list of feeds 220 and the individual feeds 210. The navigation bar 304 can also include a sharing button 310. The sharing button 310 provides differing avenues of sharing one or more of the feeds 210, such as, sharing the feed 210 by e-mail, text message, or a social networking platform. The content area 306 provides display of the subset of the ranked list of feeds 220, or upon selection of one of the feeds 210, the individual feed 210.

The subset of the ranked list of feeds 220 is provided for interaction with by the user of the mobile device 110. As shown, the subset of the ranked list of feeds 220 displays a listing of five feeds 210; however, the subset of the ranked list of feeds 220 can include any number of feeds 210 depending upon, for example, the screen display size and/or the operating system of the mobile device 110. Further, the number of listing of feeds 210 that is displayed can be altered depending on whether the mobile device 110 is in landscape or portrait mode. Additionally, the subset of the ranked list of feeds 220 can be scrollable such that additional listing of feeds 210 can be displayed by scrolling the subset of the ranked list of feeds 220. To that end, upon selection of one of the feeds 210, data relating to the selected feed 210 can be displayed by the mobile device 110 within the content area 306.

FIG. 4 illustrates an example method 400 for providing prioritized content. The example method 400 can be executed, for example, by the feed prioritization module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 402, for each feed of one or more feeds delivered to a mobile device through a portal, one or more associated tags are detected. For example, the feed prioritization module 104 or the portal 204 detects the tags 212 associated with each of the feeds 210. Further, each of the tags 212 can have an associated keyword.

In step 404, the one or more tags associated with the plurality of feeds are compared to one or more properties associated with a user profile of a user in the portal. For example, the feed prioritization module 104 compares the tags 212 of the feeds 210 with the properties 214 of the user profile 180 for a particular user.

In step 406, based on the comparison, the plurality of feeds are ranked to define a ranked list of feeds. For example, the feed prioritization module 104 ranks the feeds 210 based on the comparison of the tags 212 of the respective feeds 210 to the properties 214 of the user profile 180 for the particular user. The feed prioritization module 104 can assign ranking values to the feeds 210 based on the comparison. Additionally, based on this ranking, the feed prioritization module 104 defines a ranked list of feeds 220.

In step 408, a subset of the ranked list of feeds are prepared for display on the mobile device. For example, the feed prioritization module 104 or the portal 204 prepares a subset of the ranked list of feeds 220 for display on the mobile device 110. In some embodiments, the subset of the ranked list of feeds 220 can include feeds 210 having a ranking value greater than a ranking threshold.

FIG. 5 illustrates an example method 500 for providing prioritized content based on user interaction. The example method 500 can be executed, for example, by the feed prioritization module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 502, after preparing for display the subset of the ranked list of feeds in step 408, feedback is received indicating a user interaction with the subset of the ranked list of feeds to define an interacted plurality of feeds. For example, the portal 204 or the feed prioritization module 104 receive feedback indicating interaction by the user with the subset of the ranked list of feed 220 that are provided by the mobile device 110. The feeds 210 that are interacted with by the user are defined as interacted feeds 216.

In step 504, for each feed of the interacted plurality of feeds, detecting one or more associated tags to define interacted tags. For example, the feed prioritization module 104 or the portal 204 detects tags 212 that are associated with the interacted feeds 216.

In step 506, the interacted tags are associated with the user profile of the user. For example, the feed prioritization module 104 can associated the tags 212 associated with the interacted feeds 216 with the user profile 180 of the particular user.

In step 508, the tags associated with the plurality of feeds are compared to the interacted tags associated with the user profile of the user. For example, the feed prioritization module 104 compares the tags 212 that are associated with the user profile 180 (i.e., tags 212 associated with the interacted feeds 216) with tags 220 of the additional feeds 218 (e.g., the additional feeds 210 including the feeds 210, a subset of the feeds 210, new feeds, or any combination thereof).

In step 510, based on the comparison, a ranking value of the plurality of feeds is altered. For example, the feed prioritization module 104 alters the ranking value of the feeds 210 (or assigns ranking values to the additional feeds 218) based on the comparison.

In step 512, based on the altering, the ranked list of feeds is re-ranked. For example, the feed prioritization module 104 re-ranks, similar to that mentioned above in step 406, the feeds 210. Also, the feed prioritization module 104 can rank the additional feeds 218, similar to that mentioned above in step 406.

A number of implementations have been described. Nevertheless, it will be understood that various modifications may be made. For example, other methods described herein besides or in addition to that illustrated in FIG. 1-5 may be performed. Further, the illustrated steps of methods 400 and 500 may be performed in different orders, either concurrently or serially. Further, steps may be performed in addition to those illustrated in methods 400 and 500, and some steps illustrated in methods 400 and 500 may be omitted without deviating from the present disclosure. Accordingly, other implementations are within the scope of the following claims.

What is claimed is:

1. A computer-implemented method of providing prioritized content to a mobile communication device, the method comprising:
   detecting, for each feed of a plurality of web feeds delivered to the mobile communication device through a web portal, one or more tags associated with the web feed, each tag comprising a keyword;
   comparing the one or more tags associated with the plurality of web feeds to one or more properties associated with a user profile of a user in the web portal;
   ranking, based on the comparison, the plurality of web feeds to define a ranked list of web feeds;
   preparing the ranked list of web feeds for display on the mobile communication device;
   receiving user interaction feedback indicating a user interaction with the ranked list of web feeds to provide a plurality of interacted web feeds, the plurality of interacted web feeds being a subset of the ranked list of web feeds;
   detecting, for each interacted web feed, one or more tags associated with the interacted web feed to provide one or more interacted tags; and
   associating the one or more interacted tags with the user profile of the user to provide an updated user profile, the updated user profile including the one or more interacted tags of the plurality of interacted web feeds.

2. The computer-implemented method of claim 1, wherein ranking comprises at least one of:
   providing a ranking value to each of the plurality of web feeds based on the comparison; or
   ordering the plurality of web feeds based on the ranking value from a highest ranking value to a lowest ranking value.

3. The computer-implemented method of claim 1, wherein the one or more properties associated with the user profile comprises one or more user-related tags and one or more roles of the user.

4. The computer-implemented method of claim 1, wherein preparing the ranked list of web feeds further comprises preparing the ranked list of web feeds for display on the mobile communication device based on a screen display size of the mobile communication device.

5. The computer-implemented method of claim 1, further comprising:
   receiving a location of the user, wherein ranking further includes ranking the plurality of web feeds based on the location.

6. The computer-implemented method of claim 1, further comprising:
   receiving one or more user-defined tags associated with the ranked list of web feeds, wherein comparing further includes comparing the one or more user-defined tags with the user profile of the user.

7. The computer-implemented method of claim 1, wherein detecting the one or more tags associated with the plurality of web feeds further comprises detecting metadata including the one or more tags of the plurality of web feeds.

8. The computer-implemented method of claim 1, wherein comparing the one or more tags to one or more properties associated with the user profile of the user further includes matching the one or more tags with the properties associated with the user profile, the method further comprising at least one of:
   increasing a ranking value of the web feeds associated with the one or more tags that are matched with the properties associated with the user profile; or
   increasing the ranking value of the web feeds based on a number of associated tags that match the properties associated with the user profile.

9. The computer-implemented method of claim 1, further comprising:
   comparing one or more additional tags associated with an additional plurality of web feeds to the interacted tags and the one or more properties associated with the updated user profile; and
   ranking, based on the comparison, the additional plurality of web feeds to define an additional ranked list of web feeds.

10. The computer-implemented method of claim 9, wherein the user interaction feedback indicating the user interaction further comprises user interaction feedback indicating a time of the user interaction, the method further comprising associating the time with the one or more interacted tags, and
    wherein ranking the additional plurality of web feeds further comprises ranking the additional plurality of web feeds based on the associated time of the one or more interacted tags relative to a current time.

11. A computer storage medium encoded with a computer program for providing prioritized content to a mobile communication device, the program comprising instructions that when executed by one or more computers cause the one or more computers to perform operations comprising:
    detecting, for each feed of a plurality of web feeds delivered to the mobile communication device through a web portal, one or more tags associated with the web feed, each tag comprising a keyword;
    comparing the one or more tags associated with the plurality of web feeds to one or more properties associated with a user profile of a user in the web portal;
    ranking, based on the comparison, the plurality of web feeds to define a ranked list of web feeds;
    preparing of the ranked list of web feeds for display on the mobile communication device;
    receiving user interaction feedback indicating an user interaction with the ranked list of web feeds to provide a plurality of interacted web feeds, the plurality of interacted web feeds being a subset of the ranked list of web feeds;

detecting, for each interacted web feed, one or more tags associated with the interacted web feed to provide one or more interacted tags; and associating the one or more interacted tags with the user profile of the user to provide an updated user profile, the updated user profile including the one or more interacted tags of the plurality of interacted web feeds.

12. The computer storage medium of claim 11, where the one or more properties associated with the user profile comprises one or more user-related tags and one or more roles of the user.

13. The computer storage medium of claim 11, wherein the operation of preparing the ranked list of web feeds further comprises preparing the ranked list of web feeds for display on the mobile communication device based on a screen display size of the mobile communication device.

14. The computer storage medium of claim 11, wherein the operations further comprise:

receiving one or more user-defined tags associated with the ranked list of web feeds, wherein comparing further includes comparing the one or more user-defined tags with Ihe user profile of the user.

15. The computer storage medium of claim 11, wherein the operation of comparing the one or more tags to one or more properties associated with the user profile of the user further includes matching the one or more tags with the properties associated with the user profile, the operations further comprising at least one of:

increasing a ranking value of the web feeds associated with the one or more tags that arc matched with the properties associated with the user profile; or increasing the ranking value of the web feeds based on a number of associated tags that match the properties associated with the user profile.

16. The computer storage medium of claim 11, wherein the operations further comprise:

comparing one or more additional tags associated with an additional plurality of web feeds to the interacted tags and the one or more properties associated with the updated user profile; and ranking, based on the comparison, the additional plurality of web feeds to define an additional ranked list of web feeds.

17. The computer storage medium of claim 16, wherein the operation of receiving the user interaction feedback indicating the user interaction further comprises the user interaction feedback indicating a time of the user interaction, the operations further comprise associating the time with the one or more interacted tags, and wherein the operation of ranking the additional plurality of web feeds further comprises ranking the additional plurality of web feeds based on the associated time of the one or more interacted tags relative to a current time.

18. A computing system for providing prioritized content to a mobile communication device, the computing system comprising one or more memory modules, one or more processors, and instructions stored on one or more of the memory modules and operable when executed with the one or more processors to perform operations comprising:

detecting, for each feed of a plurality of web feeds delivered to the mobile communication device through a web portal, one or more tags associated with the web feed, each tag comprising a keyword;

comparing the one or more tags associated with the plurality of web feeds to one or more properties associated with a user profile of a user in the web portal;

ranking, based on the comparison, the plurality of web feeds to define a ranked list of web feeds;

preparing the ranked list of web feeds for display on the mobile communication device;

receiving user interaction feedback indicating an user interaction with the ranked list of web feeds to provide a plurality of interacted web feeds, the plurality of interacted web feeds being a subset of the ranked list of web feeds;

detecting, for each interacted web feed, one or more tags associated with the interacted web feed to provide one or more interacted tags; and associating the one or more interacted tags with the user profile of the user to provide an updated user profile, the updated user profile including the one or more interacted tags of the plurality of interacted web feeds.

19. The computing system of claim 18, where the one or more properties associated with the user profile comprises one or more user-related tags and one or more roles of the user.

20. The computing system of claim 18, where the operations further comprise:

comparing one or more additional tags associated with an additional plurality of web feeds to the interacted tags and the one or more properties associated with the updated user profile; and ranking, based on the comparison, the additional plurality of web feeds to define an additional ranked list of web feeds.

21. The computing system of claim 20, wherein the operation of receiving the user interaction feedback indicating the user interaction further comprises the user interaction feedback indicating a time of the user interaction, wherein the operations further comprise associating the time with the one or more interacted tags, and wherein the operation of ranking the additional plurality of web feeds further comprises ranking the additional plurality of web feeds based on the associated time of the one or more interacted tags relative to a current time.

* * * * *